Nov. 29, 1927. 1,651,014
W. A. COGSHALL
SEXTANT
Filed April 7, 1926
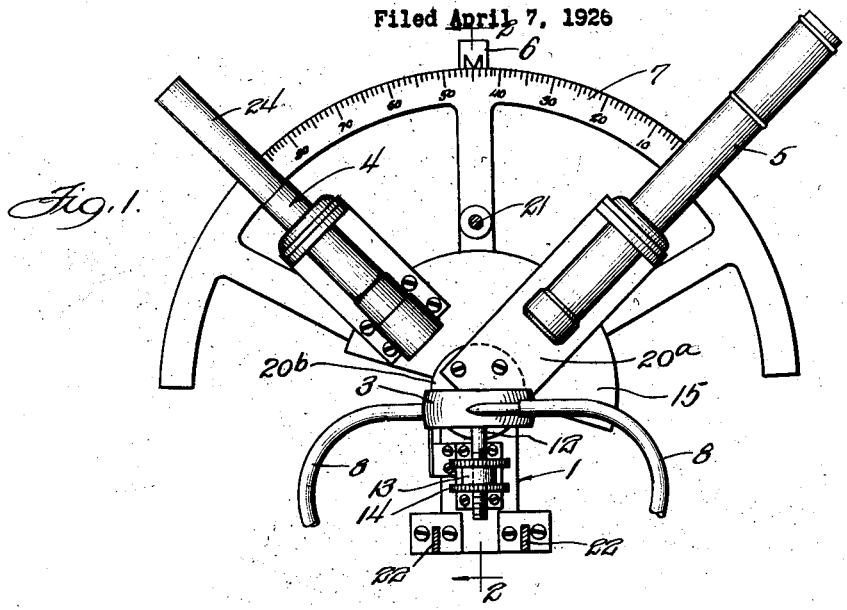
Fig. 1.
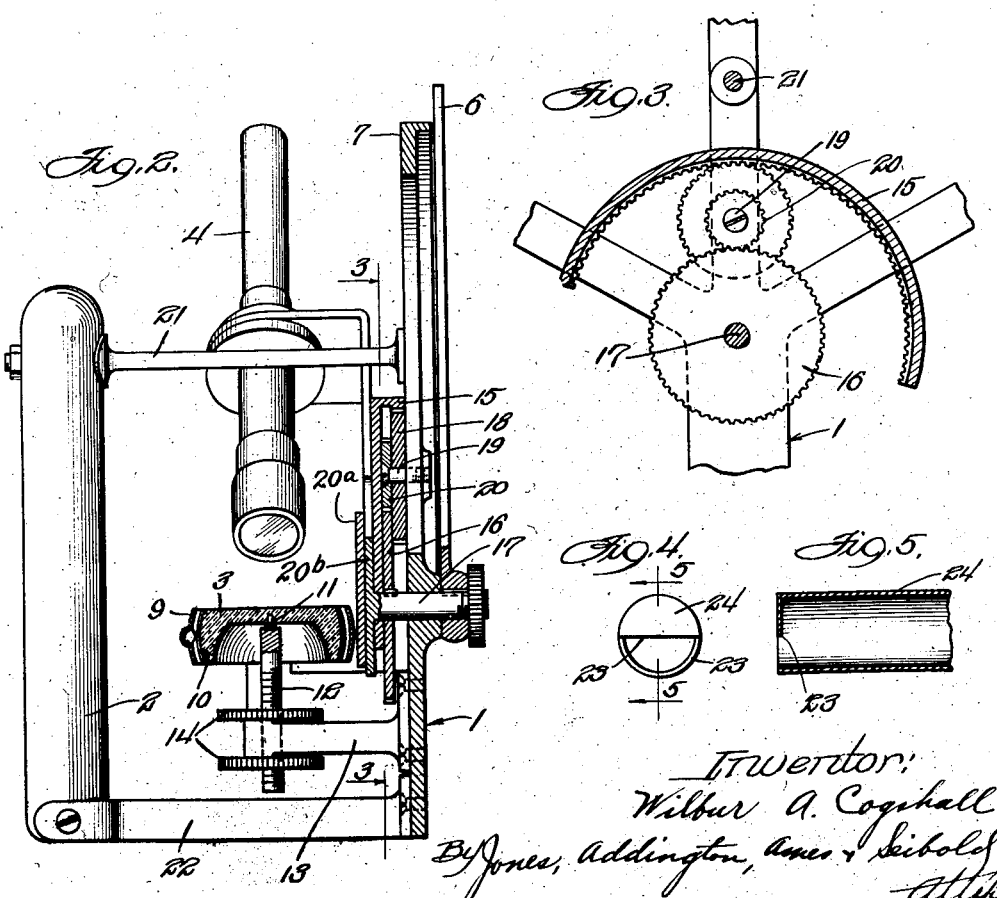
Inventor:
Wilbur A. Cogshall
By Jones, Addington, Ames & Seibold
Attys Patented Nov. 29, 1927.

1,651,014

UNITED STATES PATENT OFFICE.

WILBUR A. COGSHALL, OF BLOOMINGTON, INDIANA.

SEXTANT.

Application filed April 7, 1926. Serial No. 100,273.

My invention relates to sextants.

One of the objects of my invention is to provide an improved sextant by means of which the elevation of an observed object may be readily determined. A further object is to provide an improved sextant having a mirror which is automatically held horizontal and having two sight members angularly adjustable about a common axis, and having provisions whereby when one sight member is moved the other will be moved also, and whereby the angle of elevation of the sight members with respect to the horizontal may be readily determined. Further objects will appear from the description and claims.

In the drawings in which an embodiment of my invention is shown—

Figure 1 is a side elevation of the sextant;

Fig. 2 is a section on the line 2—2 of Fig. 1;

Fig. 3 is a section on the line 3—3 of Fig. 2;

Fig. 4 is an end view of an adjustable sight-cap for one of the sight members; and Fig. 5 is a section on the line 5—5 of Fig. 4.

Referring now to the drawings in detail, the construction therein comprises a supporting frame 1 having a handle 2, a gyroscopic mirror 3 rotatably mounted on the frame 1, a sight tube 4 mounted for angular adjustment on said frame about an axis at the surface of the gyroscopic mirror, to receive the rays of light from the observed object, and a telescope 5 also mounted for angular adjustment on the supporting frame about the same axis as the sight tube, to receive the reflected ray from the mirror. Gearing is provided between the sight tube and the telescope so that when one is moved angularly with respect to the supporting frame the other will be moved also but in the opposite direction. An index member 6 is provided which is secured to move with the telescope. An arcuate scale 7 is mounted on the supporting frame for cooperating with this index. Any suitable means may be provided for rotating the gyroscopic mirror, the means shown comprising a pair of tubes 8 through which compressed air is supplied to an annular housing member 9 surrounding the rotatable mirror, the tubes opening into this housing at such an angle that the air will be forced tangentially against the small vanes 10 formed on the edge of the rotatable mirror. The mirror is rotatably mounted by means of a small pintle 11 secured to the underside of the mirror which rests in a cupped post 12 which is adjustably mounted on a bracket 13 secured to the supporting frame 1. The supporting post may be secured in any desired position of vertical adjustment by means of a pair of lock nuts 14 threaded on the post 12, one above and one below the supporting bracket 13.

The gearing between the sight tube and telescope is such that their angular movement with respect to the supporting frame will be equal but in opposite directions. This gearing comprises a semi-circular internal gear member 15 secured to swing with the sight tube 4, an external gear 16 secured to a shaft 17 which turns with the telescope 5, an external gear 18 rotatably mounted on a stud 19 mounted on the supporting frame 1 and meshing with the internal gear 15 and a pinion 20 secured to rotate with the gear 18 and meshing with the gear 16 which rotates with the telescope 5. The telescope 5 is mounted on a bracket 20$^a$ which bracket in turn is secured to a disc 20$^b$ which may be formed integral with the shaft 17.

As stated above, the gearing between the tube and telescope should be such that the tube and telescope will have equal angular movement but in opposite directions. This condition will be fulfilled if the pitch diameters of the internal gear 15 and the external gear 16 have the same ratio to each other as the pitch diameters of the external gear 18 and the pinion 20 have to each other.

The index 6 previously referred to is secured to the same shaft 17 on which the telescope 5 and external gear are mounted so that the index moves with the telescope. The handle 2 is secured to the supporting frame 1 by means of brackets 21 and 22.

In use, to determine the elevation of the observed object, the observer holds the instrument by the handle, trying to hold the handle as nearly vertical as possible, and adjusts the telescope, and with it the sight tube, until he is able to see the object to be observed in the horizontal mirror. This requires that the angle which the sight tube makes with the horizontal surface of the mirror shall be equal to the angle which the telescope makes with the mirror because of the law that the angle of the reflected ray is equal to the angle of the incident ray. When the observer has manipulated the instrument so that he is able to see the object to be observed in the mirror, the reading is taken on the scale which shows the angle of elevation of the observed object.

In making the observation the telescope is adjusted so as to bring the straight edge 23 of the sight cap 24 as nearly as possible in the center of the observed object. In order to take care of any slight inaccuracy in the reading which might result from the straight edge 23 not being exactly in the axis of the sight tube, the sight cap can be swivelled through 180 degrees on the sight tube and another reading taken. The correct reading would be an average of the two readings.

I claim:

1. An instrument for determining the elevation of an object comprising a mirror which is automatically maintained with its reflecting surface horizontal as the instrument is manipulated, two sight members mounted to swing about a common axis at the reflecting surface of the mirror, one of said sight members to be sighted at the observed object so that the rays therefrom will strike the mirror and be reflected, and the other sight member to be alined with the reflected ray, and means including transmission between said sight members whereby when one is swung about said common axis the other also will be swung in an opposite direction about said axis to an equal degree.

2. An instrument for determining the elevation of an object comprising a mirror which is automatically maintained with its reflecting surface horizontal as the instrument is manipulated, two sight members mounted to swing about a common axis at the reflecting surface of the mirror, one of said sight members to be sighted at the observed object so that the rays therefrom will strike the mirror and be reflected, and the other sight member to be alined with the reflected ray, means including transmission between said sight members whereby when one is swung about said common axis the other also will be swung in an opposite direction about said axis to an equal degree, and an index mounted to swing with one of said sight members, for indicating the elevation of the observed object.

3. An instrument for determining the elevation of an object comprising a mirror which is automatically maintained with its reflecting surface horizontal as the instrument is manipulated, two sight members mounted to swing about a common axis at the reflecting surface of the mirror, one of said sight members to be sighted at the observed object so that the rays therefrom will strike the mirror and be reflected, and the other sight member to be alined with the reflected ray, means including transmission between said sight members whereby when one is swung about said common axis the other also will be swung in an opposite direction about said axis to an equal degree, and an index mounted to swing with one of said sight members, for indicating the elevation of the observed object, a support on which said sight members are mounted and a scale mounted on said support and cooperating with said index.

4. An instrument for determining the elevation of an object comprising a mirror which is automatically maintained with its reflecting surface horizontal as the instrument is manipulated, two sight members mounted to swing about a common axis at the reflecting surface of the mirror, one of said sight members to be sighted at the observed object so that the rays therefrom will strike the mirror and be reflected, and the other sight member to be alined with the reflected ray, transmission between said sight members whereby when one is swung about its axis the other also will be swung about its axis, and an index mounted to swing with one of said sight members, for indicating the elevation of the observed object, a support on which said sight members are mounted and a scale mounted on said support and cooperating with said index, the transmission between said sight members being such that as the sight members are moved about the common axis they will have equal angular movement with respect to the support but in opposite directions.

5. An instrument for determining the elevation of an object comprising a mirror which is automatically maintained with its reflecting surface horizontal as the instrument is manipulated, two sight members mounted to swing about a common axis at the reflecting surface of the mirror, one of said sight members to be sighted at the observed object so that the rays therefrom will strike the mirror and be reflected, and the other sight member to be alined with the reflected ray, transmission between said sight members whereby when one is swung about its axis the other also will be swung about its axis, and an index mounted to swing with one of said sight members, for indicating the elevation of the observed object, a support on which said sight members are mounted and a scale mounted on said support and cooperating with said index, the transmission between said sight members being such that as the sight members are moved about the common axis they will have equal angular movement with respect to the support but in opposite directions, said transmission comprising an internal gear mounted to move with one of said sight members, an external gear meshing with said internal gear, a pinion rotatable with said external gear, said pinion and external gear being mounted on said support and a second external gear meshing with said pinion and rotatable with the other sight member, the pitch diameters of said internal gear and the second external gear having the same ratio as the pitch diameters of said first external gear and said pinion.

6. An instrument for determining the elevation of an object comprising a mirror which is automatically maintained with its reflecting surface horizontal as the instrument is manipulated, two sight members mounted to swing about a common axis at the reflecting surface of the mirror, one of said sight members to be sighted at the observed object so that the rays therefrom will strike the mirror and be reflected, and the other sight member to be alined with the reflected ray, and means whereby when one is swung about said common axis the other also will be swung in an opposite direction about said axis to an equal degree.

In witness whereof, I have hereunto subscribed my name.

WILBUR A. COGSHALL.